(12) United States Patent
Yu (10) Patent No.: US 8,533,613 B2
(45) Date of Patent: Sep. 10, 2013

(54) METHOD AND APPARATUS FOR TRANSCODING WEB PAGE TO BE DISPLAYED ON MOBILE TERMINAL

(75) Inventor: Seung Hyun Yu, Incheon (KR)

(73) Assignee: NHN Corporation, Seongnam-si (KR)

( * ) Notice: Subject to any disclaimer, the term of this patent is extended or adjusted under 35 U.S.C. 154(b) by 551 days.

(21) Appl. No.: 12/631,498

(22) Filed: Dec. 4, 2009

(65) Prior Publication Data

US 2010/0146413 A1   Jun. 10, 2010

(30) Foreign Application Priority Data

Dec. 8, 2008 (KR) .................. 10-2008-0124245

(51) Int. Cl.
   *G06F 3/00* (2006.01)
(52) U.S. Cl.
   USPC ........ 715/760; 715/761; 715/762; 715/764; 715/723; 715/861; 715/204; 715/238; 715/246
(58) Field of Classification Search
   USPC ............. 715/760, 761–762, 764, 205, 243, 715/238
   See application file for complete search history.

(56) References Cited

U.S. PATENT DOCUMENTS

| 7,750,825 | B2* | 7/2010 | Zuverink ............... 340/995.15 |
| 8,020,090 | B2* | 9/2011 | Chen et al. ............... 715/238 |
| 2002/0016801 | A1* | 2/2002 | Reiley et al. ............ 707/523 |
| 2005/0195221 | A1* | 9/2005 | Berger et al. ........... 345/660 |
| 2007/0201761 | A1* | 8/2007 | Lueck .................... 382/276 |
| 2008/0016462 | A1* | 1/2008 | Wyler et al. ............ 715/810 |
| 2008/0153467 | A1* | 6/2008 | Wyler et al. ............ 455/414.2 |
| 2008/0231642 | A1* | 9/2008 | Okita ..................... 345/629 |
| 2008/0316229 | A1* | 12/2008 | Terayoko ............... 345/660 |
| 2008/0320396 | A1* | 12/2008 | Mizrachi et al. ....... 715/744 |
| 2010/0316302 | A1* | 12/2010 | Lueck .................... 382/229 |
| 2012/0005565 | A1* | 1/2012 | Chen et al. ............. 715/205 |

FOREIGN PATENT DOCUMENTS

| JP | 10-320163 | 12/1998 |
| JP | 2003-271507 | 9/2003 |
| JP | 2007-159081 | 6/2007 |
| KR | 10-2008-0011737 | 2/2008 |
| KR | 10-2008-0098817 | * 11/2008 |
| KR | 20070044155 | * 7/2012 |

OTHER PUBLICATIONS

Scott Garrett Pitkin; Design and Delivery of a pervasive Web application Interface; 2003; University of Cincinnati; 107 page.*
Hwang et al., "Structure-Aware web Transcoding for Mobile Device," 2003, IEEE, pp. 14-22.*
Chen et al., "Adapting Web Pages for Small-Screen Devices," 2005, IEEE, pp. 50-57.*

* cited by examiner

*Primary Examiner* — Linh K Pham (74) *Attorney, Agent, or Firm* — H.C. Park & Associates, PLC (57) ABSTRACT

The present disclosure relates to a method and apparatus for transcoding a web page into a format suitable for display on a mobile terminal. The method includes dividing a web page into a plurality of segments, transcoding each of the segments into a format suitable for display on a mobile terminal, storing the transcoded segments and location icons in association with each other, each of the location icons indicating a location of each segment in the web page, and if one of the location icons is selected on the mobile terminal, providing a segment associated with the selected location icon to the mobile terminal.

17 Claims, 7 Drawing Sheets

METHOD AND APPARATUS FOR TRANSCODING WEB PAGE TO BE DISPLAYED ON MOBILE TERMINAL

CROSS REFERENCE TO RELATED APPLICATION

This application claims priority from and the benefit of Korean Patent Application No. 10-2008-0124245, filed on Dec. 8, 2008, which is hereby incorporated by reference for all purposes as if fully set forth herein.

BACKGROUND OF THE INVENTION

1. Field of the Invention

Exemplary embodiments of the present invention relate to a method and apparatus for transcoding a web page to be displayed on a mobile terminal.

2. Discussion of the Background

With the development of mobile communication and wireless Internet technologies, web users increasingly want to view web pages on mobile terminals, such as mobile phones, as well as monitor screens of desktop computers. However, web pages provided over the Internet are generally adapted for display on desktop computers. Accordingly, the web pages may not be appropriately displayed on a mobile terminal since the mobile terminal does not have sufficient capabilities to fully display complex web page content.

In order to allow an Internet web page to be displayed on a mobile terminal, a transcoding technique has been developed that can modify a web page to contain primarily text information excluding mobile image information or the like among varied web page content.

Herein, the term "transcoding technique" means a method of enabling web pages to be viewed on a mobile terminal. For example, when a web page is displayed on a mobile phone or the like, which may be limited in terms of CPU speed, memory capacity and screen size, an image is reduced or the web page is divided into segments in order to provide the web page to a user in a suitable state.

Since a web page often cannot be fully displayed on a mobile terminal, the web page may be divided into a plurality of segments when displayed on the mobile terminal. Thus, when a user selects 'Next Page' or any one of sequential page indicators, such as, for example, '1, 2, 3, 4, 5' at a lower side of a terminal screen, a selected section of the web page is displayed on the screen.

Figure 1:
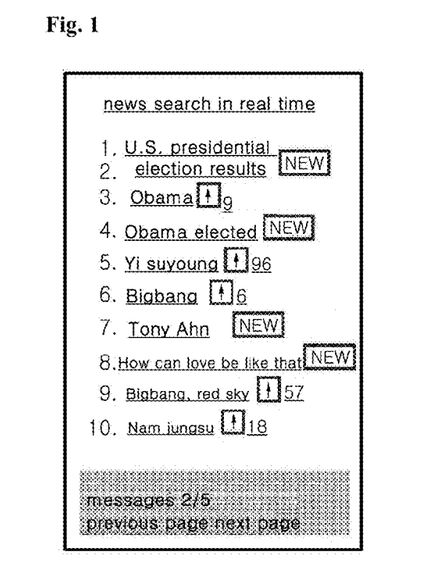
FIG. 1 is a view of a screen of a conventional mobile terminal on which a web page is displayed.

FIG. 1 is a view of a screen of a conventional mobile terminal on which a web page is displayed.

Referring to FIG. 1, only a portion of the web page is displayed on the conventional mobile terminal.

A user may click on 'Previous Page' or 'Next Page' at the lower side of the screen of the mobile terminal to view other portions of the web page.

However, since the conventional mobile terminal does not display information about the structure of the whole web page, a user cannot find where currently displayed content is located in the web page.

Thus, since the user can neither know the structure of the web page nor easily find desired content. Thus when viewing the web page on the screen of the mobile terminal, the user cannot achieve the same level of satisfaction as when viewing the webpage on a desktop computer monitor.

Korean Patent Laid-open Publication No. 10-2004-0038458 discloses an invention, entitled "Web contents transcoding system and method for small display devices" The invention relates to a method and system for converting a web page adapted for display on desktop computers to be efficiently displayed on a small-sized terminal.

However, this publication merely discloses a technique of dividing the whole web page into a plurality of segments to be displayed on the small-sized terminal and does not provide information about the structure of the web page to a user. Accordingly, the user cannot grasp where current content is located in the web page.

SUMMARY OF THE INVENTION

Exemplary embodiments of the present invention provide a solution to the problems of the conventional technique as described above.

Exemplary embodiments of the present invention also provide a method of transcoding a web page into a format suitable for display on a mobile terminal with a relatively small screen.

Exemplary embodiments of the present invention also provide a method of displaying a web page on a mobile terminal with a relatively small screen.

Exemplary embodiments of the present invention also provide a transcoder for transcoding a web page into a format suitable for display on a mobile terminal with a relatively small screen.

Additional features of the invention will be set forth in the description which follows, and in part will be apparent from the description, or may be learned by practice of the invention.

An exemplary embodiment of the present invention discloses a method of transcoding content to be displayed on a mobile terminal, including dividing a web page into a plurality of segments, transcoding each of the plurality of segments into a format suitable for display on the mobile terminal, storing the transcoded plurality of segments in association with a plurality of location icons each of the plurality of location icons indicating a location of a corresponding segment in the web page, and providing a first segment associated with a selected location icon to the mobile terminal in response to selection of one of the plurality of location icons on the mobile terminal.

An exemplary embodiment of the present invention also discloses a non-transitory computer-readable recording medium including an executable program which, when executed, performs the steps of dividing a web page into a plurality of segments, transcoding each of the plurality of segments into a format suitable for display on the mobile terminal, storing the transcoded plurality of segments in association with a plurality of location icons each of the plurality of location icons indicating a location of a corresponding segment in the web page, and providing a first segment associated with a selected location icon to the mobile terminal in response to selection of one of the plurality of location icons on the mobile terminal.

An exemplary embodiment of the present invention also discloses a method of displaying content on a mobile terminal, including displaying N location icons indicating locations of corresponding N segments of a web page divided into the N segments, N being a natural number greater than or equal to two, receiving a signal indicating selection of one of the N location icons, and displaying a first segment associated with the selected location icon on the mobile terminal.

An exemplary embodiment of the present invention also discloses a non-transitory computer-readable recording medium including an executable program which, when executed, performs the steps of displaying N location icons indicating locations of corresponding N segments of a web page divided into the N segments, N being a natural number greater than or equal to two, receiving a signal indicating selection of one of the N location icons, and displaying a first segment associated with the selected location icon on the mobile terminal.

An exemplary embodiment of the present invention also discloses a transcoder for transcoding content into a format suitable for display on a mobile terminal, including a web page-dividing module to divide a web page into a plurality of segments, a transcoding module to transcode each of the plurality of segments into a format suitable for display on the mobile terminal, an icon-associated storage to store the transcoded plurality of segments in association with a plurality of location icons, each location icon indicating a location of a corresponding segment in the web page, and a content-providing module to provide a stored first segment associated with a selected location icon to the mobile terminal in response to selection of one of the plurality of location icons on the mobile terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Illustration of details not directly related to the detailed description of exemplary embodiments of the present invention is omitted in the drawings for clarity.

In the following description and claims, the terms "coupled" or "connected" are used to indicate not only that two or more elements may be "directly or physically connected" to each other, but also that two or more elements may be "electrically connected" to each other where intervening elements may be present. Further, in the following description and claims, the terms "includes", "has" "with" or "comprises" are intended not to exclude other components but to further include other components unless otherwise indicated.

Exemplary embodiments of the present invention will now be described in detail with reference to the accompanying drawings.

Figure 2:
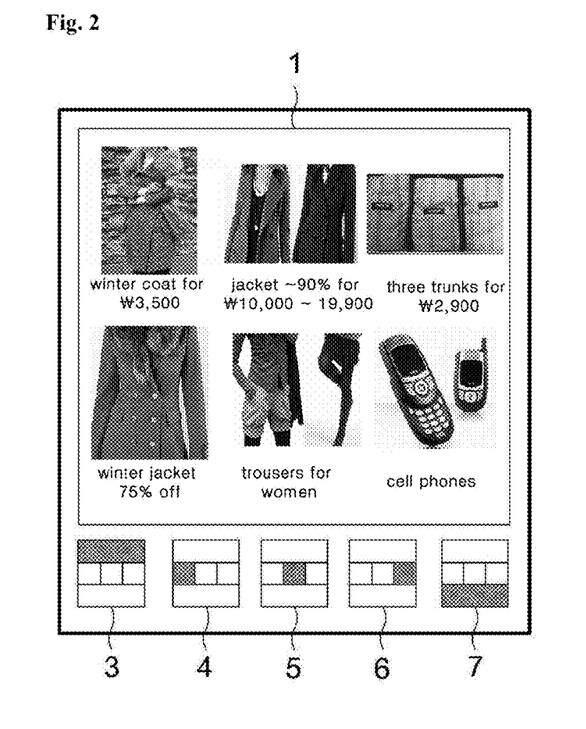
FIG. 2 is a view of a relatively small screen of a mobile terminal on which a web page is displayed, in accordance with an exemplary embodiment of the present invention.
Figure 3:
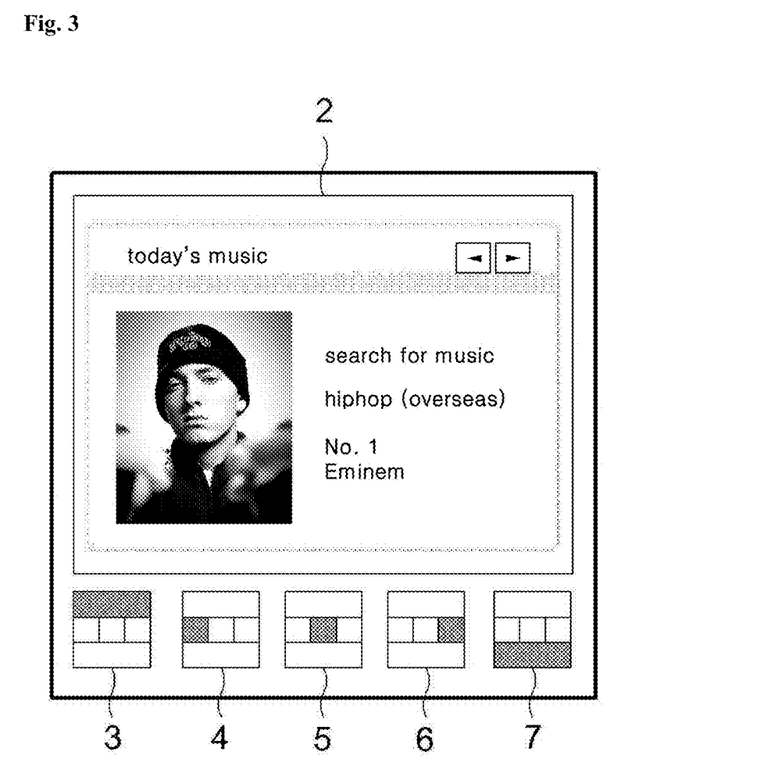
FIG. 3 is a view of a relatively small screen of a mobile terminal on which a web page is displayed, in accordance with an exemplary embodiment of the present invention.

FIGS. 2 and 3 show examples of a relatively small screen of a mobile terminal, on which a web page is displayed, according to an exemplary embodiment of the present invention.

FIG. 2 illustrates a case where a user selects a location icon corresponding to a left sidebar.

Referring to FIG. 2, the mobile terminal displays a screen with transcoded web page content 1 and a plurality of location icons 3, 4, 5, 6, and 7.

The web page content 1 corresponds to a left sidebar of a web page as it would be displayed on a monitor of a desktop computer. Clicking on the location icon 4 may display the web page content 1 corresponding to the left sidebar associated with the location icon 4.

The location icons 3, 4, 5, 6, and 7 are displayed, for example, on a lower side, upper side, left side, or right side of a screen of the mobile terminal. The number and format of location icons may be determined based on dividing a web page into a plurality of segments and analyzing a structure of the web page. Herein, the term "segment" refers to a group of one or more elements constituting at least a portion of a web page. The segment may be, for example, a header, a left sidebar, a right sidebar, a body or a footer.

For example, a web page that is divided into five segments may have five location icons. If it is determined that a web page is composed of a header, a footer, a left sidebar, a right sidebar, and a body based on the analysis of the structure of the web page, the location icons 3, 4, 5, 6, and 7 may indicate the header, footer, left sidebar, right sidebar or body.

The operations of dividing the web page into a plurality of segments and of analyzing the structure of the web page will be described below.

The location icons 3, 4, 5, 6, and 7 may indicate where a plurality of segments are arranged in the web page and may be associated with content corresponding to each segment. For example, to indicate a location of each segment associated with a location icon in a web page, a portion of the location icon corresponding to the segment may be marked with a certain color, such as, for example, gray, to be distinguished from other segments, or marked with a special effect such as, for example, blinking. Accordingly, it may be easy for a user to determine which web page content is associated with the location icon in the web page and to view desired content.

For example, in the location icon 4, one segment corresponding to a left sidebar is marked in gray. Thus, a user may determine that the location icon 4 is associated with content corresponding to the left sidebar, and select the location icon 4 to view the content corresponding to the left sidebar.

FIG. 3 illustrates a case where a user selects a location icon corresponding to a right sidebar.

Referring to FIG. 3, web page content 2 corresponds to a right sidebar of a web page as it would be displayed on a monitor of a desktop computer. Clicking on the location icon 6 may display the web page content 2 corresponding to the right sidebar, which is associated with the location icon 6.

For example, in the location icon 6, one segment corresponding to a right sidebar is marked in gray. Accordingly, a user may determine that the location icon 6 is associated with content corresponding to the right sidebar, and select the location icon 6 to view the content corresponding to the right sidebar.

Figure 4:
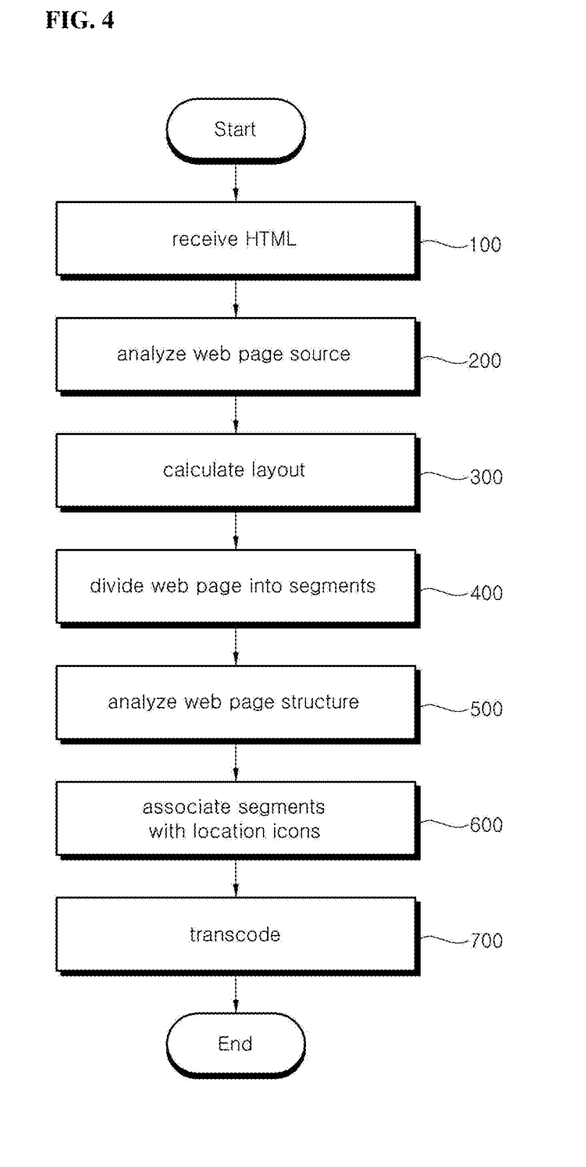
FIG. 4 is a flowchart of a method of transcoding a web page to be displayed on a mobile terminal with a relatively small screen in accordance with an exemplary embodiment of the present invention.

FIG. 4 is a flowchart of an operation of transcoding a web page for display on a mobile terminal with a relatively small screen according to an exemplary embodiment.

In operation 100, a transcoder receives HTML source code of a web page that a user wants to view on a mobile terminal. For example, the transcoder may receive HTML source code of the web page in response to a user inputting an address of a desired web page into the mobile terminal or selecting a desired web page through a browser.

In operation 200, the transcoder analyzes the web page after receiving the HTML source code of the web page. For example, the transcoder may analyze the web page to determine the number of elements of the web page, proportions of video data and text data, and the size, type and color of font, left/right/top/bottom margins and scroll bars of the text data.

In operation 300, the transcoder calculates a layout of elements of the web page. After analyzing the source code of the web page and determining the elements of the web page in operation 200, the transcoder may calculate the layout of the elements and determine the size, shape, and location of each element in operation 300. The size of each element may be calculated by multiplying the width by the height of the element.

Figure 5:
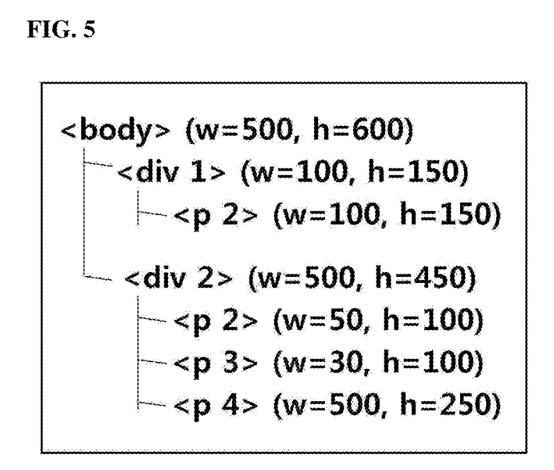
FIG. 5 shows an operation of calculating a layout of elements of a web page in accordance with an exemplary embodiment of the present invention.

FIG. 5 illustrates an operation of calculating a layout of elements of a web page according to an exemplary embodiment.

Referring to FIG. 5, the web page source code may include tags of <body>, <div> and <p>. For example, the <body> tag may indicate an entire whole web page; the <div> tag may indicate one segment; the <p> tag may indicate at least one minimum element that pertains to the <div> tag.

In operation 300, the size of a minimum element may be calculated. For example, as shown in FIG. 5, the entire web page may be composed of a zone indicated by a single tag of <body> that is composed of zones indicated by two tags of <div>. In this case, a zone indicated by a first tag of <div> may be a zone indicated by a single tag of <p> and a zone indicated by a second tag of <div> may be a zone indicated by three tags of <p>.

Assuming that the zone indicated by the <body> tag has a width of 500 and a height of 600, the web page has a size of 300,000. The zone indicated by the first tag <div> with a width of 100 and a height of 150 has a size of 15,000. The zone indicated by the second tag <div> with a width of 500 and a height of 450 has a size of 225,000.

Further, the size of a zone indicated by a single tag of <p> constituting the first tag of <div> and the size of a zone indicated by three tags of <p> constituting the second tag of <div> may be calculated in the same manner as described above.

For example, since the zone indicated by the first tag of <div> is composed of the zone indicated by the first tag of <p>, the zone indicated by the first tag of <div> is equal to the zone indicated by the first tag of <p>. Therefore, the zone indicated by the first tag of <p> has a size of 15,000.

Further, since the zone indicated by the second tag of <div> is composed of the zone indicated by the three tags of <p>, the zone indicated by the second tag of <div> is equal to the zone indicated by the three tags of <p>. For example, the zone indicated by the second tag of <p> has a width of 50 and a height of 100, the zone indicated by the second tag of <p> has a size of 5,000. Further, since the zone indicated by the third tag of <p> has a width of 30 and a height of 100, the zone indicated by the third tag of <p> has a size of 3,000. Further, since the zone indicated by the fourth tag of <p> has a width of 500 and a height of 250, the zone indicated by the fourth tag of <p> has a size of 125,000.

In operation 400, the transcoder divides the web page into a plurality of segments based on the layout of the minimum elements obtained in operation 300. In operation 400, the transcoder may set a maximum size of a single segment. Further, the transcoder may compare the set maximum segment size with the sizes of minimum elements calculated in operation 300 and combine some minimum elements within the limit of the maximum segment size to create a segment. However, if the size of a single minimum element exceeds the set maximum segment size, the minimum element may not be combined with a neighboring minimum element. Further, the combination of minimum elements may only be performed between minimum elements that belong to the same intermediate element.

For example, assuming that the set maximum segment size is 10,000, since the zone indicated by the first tag of <p> constituting the zone indicated by the first tag of <div> has a size of 15,000 in the aforementioned example, which is greater than the set maximum size of 10,000, the combination of minimum elements will not be performed even if there is a zone indicated by another tag of <p> within the zone indicated by the first tag of <div>. Further, since the zone indicated by the first tag of <p> is a minimum element, it will not be further divided although it exceeds the maximum segment size.

The operation of dividing a web page into a plurality of segments will be described with reference to FIG. 6.

Figure 6:
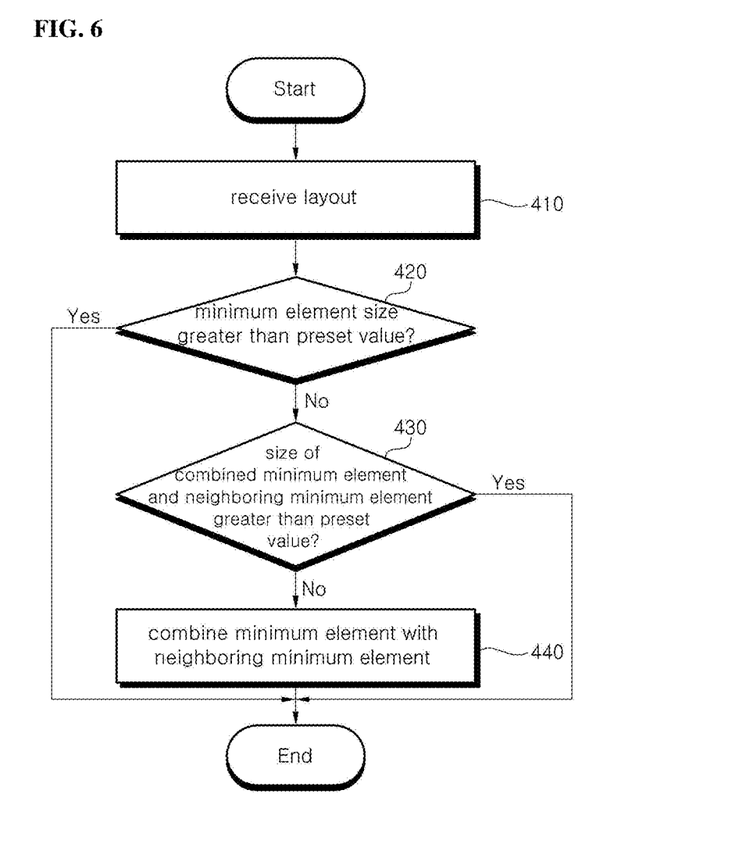
FIG. 6 is a flowchart of an operation of dividing a web page into a plurality of segments in accordance with an exemplary embodiment of the present invention.

FIG. 6 is a flowchart of an operation of dividing a web page into a plurality of segments according to an exemplary embodiment.

In operation 410, the transcoder may receive the layout of minimum elements of the web page calculated in operation 300. For example, the transcoder may receive the size of the zone indicated by each tag of <p> calculated in operation 300.

In operation 420, the transcoder may determine whether the size of each minimum element received in operation 410 exceeds a set maximum segment size.

In operation 420, if the size of a minimum element exceeds the set maximum segment size, the transcoder may determine the minimum element as a single segment without further combining or dividing the minimum element.

For example, in the aforementioned example, since the zone indicated by the fourth tag of <p> constituting the zone indicated by the second tag of <div> has a size of 125,000, the zone indicated by the fourth tag of <p> may be determined to exceed the maximum size of a single segment. Accordingly, the transcoder will not combine the zone indicated by the fourth tag of <p> with zones indicated by other tags of <p>. Further, since the zone indicated by the fourth tag of <p> may not be further divided, the transcoder may determine the zone indicated by the fourth tag of <p> as a single segment.

In operation 430, in response to finding a minimum element with a smaller size than a set maximum segment size in operation 420, the transcoder determines if a combination of the minimum element and a neighboring minimum element has a greater size than the set maximum segment size.

For example, in the aforementioned example, the zones indicated by the second tag of <p> and the third tag of <p> constituting the zone indicated by the second tag of <div> have sizes of 5,000 and 3,000, respectively. In this case, a combination of the zones indicated by the two tags of <p> will not exceed 10,000, which is the set maximum segment size. Further, the zones indicated by the two tags of <p> belong to the zone indicated by the same tag of <div>. Accordingly, the transcoder determines that the zones indicated by the two tags of <p> may be combined. However, since an additional combination with the zone indicated by the fourth tag of <p> will exceed the set maximum segment size, the transcoder determines that the additional combination with the zone indicated by the fourth tag of <p> may not be performed.

In operation 440, if it is determined in operation 430 that minimum elements may be combined, the transcoder combines the minimum elements. For example, in the aforementioned example, the zones indicated by the second tag of <p> and the third tag of <p> constituting the zone indicated by the second tag of <div> may be combined to create a single segment.

Referring again to FIG. 4, in operation 500, the transcoder determines where the segments divided in operation 400 are located in the web page to analyze the structure of the web page. For example, the transcoder may perform header searching, left sidebar searching, right sidebar searching, footer searching, and body searching. Further, the transcoder may determine, based on the search results, where the segments are located in the web page.

Next, header searching, left sidebar searching, right sidebar searching, footer searching, and body searching will be described in detail with reference to FIG. 7.

Figure 7:
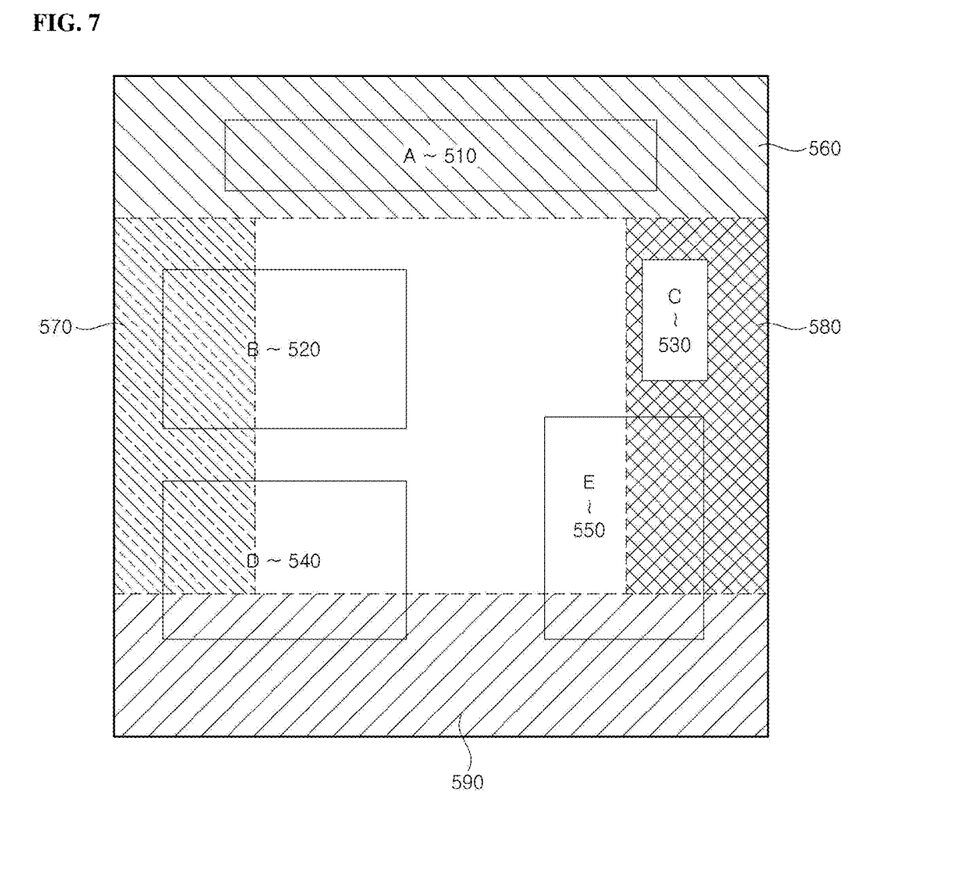
FIG. 7 shows an operation of analyzing a structure of a web page in accordance with an exemplary embodiment of the present invention.

FIG. 7 illustrates an operation of analyzing the structure of a web page according to an exemplary embodiment.

Referring to FIG. 7, a web page may include a segment A 510, a segment B 520, a segment C 530, a segment D 540 and a segment E 550. Each segment may include at least one minimum element.

Left sidebar searching is a process wherein a single segment fully included in a left sidebar search zone 570 proximate to a left side of the web page is determined as a left sidebar.

For example, as shown in FIG. 7, the transcoder may set a left sidebar search zone 570 with an area proximate to the left side of the web page. Here, since the segments B 520 and D 540 are not fully included in the left sidebar search zone 570, the transcoder may not determine the segments B 520 and D 540 as a left sidebar.

Right sidebar searching is a process wherein a single segment fully included in a right sidebar search zone 580 proximate to a right side of the web page is determined as a right sidebar.

For example, as shown in FIG. 7, since the segment C 530 is fully included in the right sidebar search zone 580 but the segment E 550 is not fully included in the right sidebar zone 580, the transcoder may determine the segment C 530 as a right sidebar and may not determine segment E 550 as a right sidebar.

Header searching is a process wherein a single segment fully included in a zone proximate to the top of the web page is determined as a header. For example, as shown in FIG. 7, the transcoder may set a header search zone 560 extending from the top of the web page. If there is a left sidebar or a right sidebar, the header may be located above the left sidebar or right sidebar so as not to overlap with the left sidebar or right sidebar. If there is not a left sidebar or a right sidebar, the height from the top of the web page may be set without being constrained by sidebar areas. Since the segment A 510 is fully included in the header search zone 560, the transcoder may determine the segment A 510 as a header.

Footer searching is a process wherein a single segment fully included in a footer search zone 590 proximate to the bottom of the web page is determined as a footer. For example, if there is a left sidebar or a right sidebar, the footer search zone may be located below the left sidebar or right sidebar, extending from the bottom of the web page.

For example, as shown in FIG. 7, since the segment D 540 and the segment E 550 are not fully included in the footer search zone 590, the transcoder will not determine the segments D 540 and E 550 as a footer.

After left sidebar searching, right sidebar searching, header searching, and footer searching, segments that are not determined as the left sidebar, right sidebar, header or footer may be determined by the transcoder as a body.

For example, the transcoder may determine the segments B 520, D 540, and E 550 as a body.

Referring again to FIG. 4, in operation 600, the transcoder stores the segments and the corresponding location icons indicating the locations of the segments in the web page so as to be associated with each other.

The location icon may have a format corresponding to the structure of the web page analyzed in operation 500. Further, the number of location icons may be the same as the number of segments determined in operation 400.

The location icons may indicate where segments are located in the web page and may correspond one-to-one with content of the respective segments. Further, a portion of a location icon corresponding to a segment in a web page may be marked in gray, marked with a certain color, or marked with a special effect such as blinking. Accordingly, a user may easily determine which content is associated with a specific location icon in the web page and view desired content.

Figure 9:
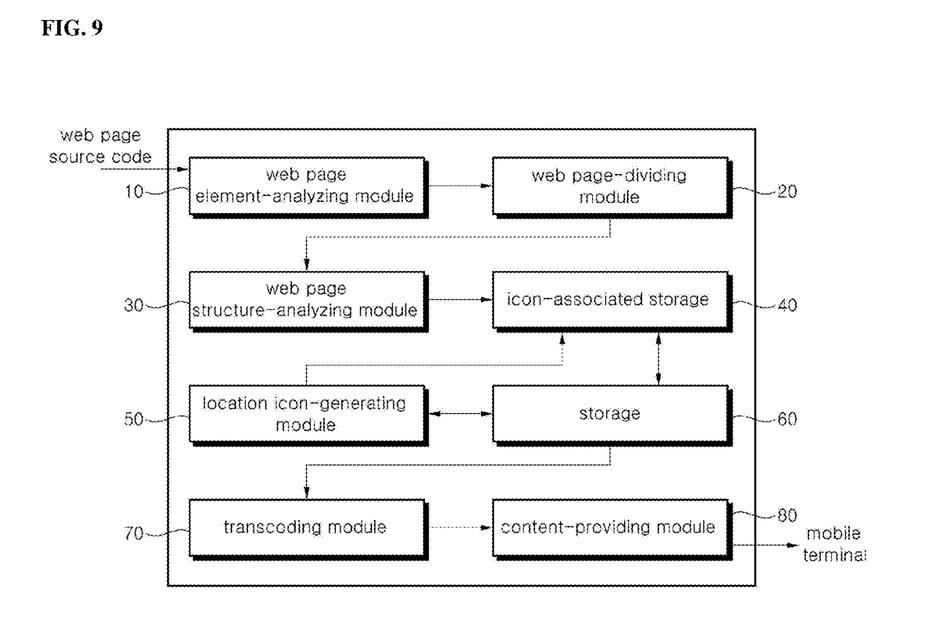
FIG. 9 is a view of a transcoder for transcoding a web page to be displayed on a mobile terminal with a relatively small screen in accordance with an exemplary embodiment of the present invention.

The location icons may be created beforehand and stored in the storage 60 in the transcoder, shown in FIG. 9. Then, in response to determination of the structure of the web page, a corresponding location icon may be read from the storage 60 and stored in association with a corresponding segment. Further, if a location icon corresponding to the structure of the web page is not stored in the storage 60 of the transcoder, the transcoder may create a location icon corresponding to the structure of the web page in real time and store the location icon in association with the segment.

The operation of storing the segment and the corresponding location icon in association with each other will be described in detail with reference to FIG. 8.

Figure 8:
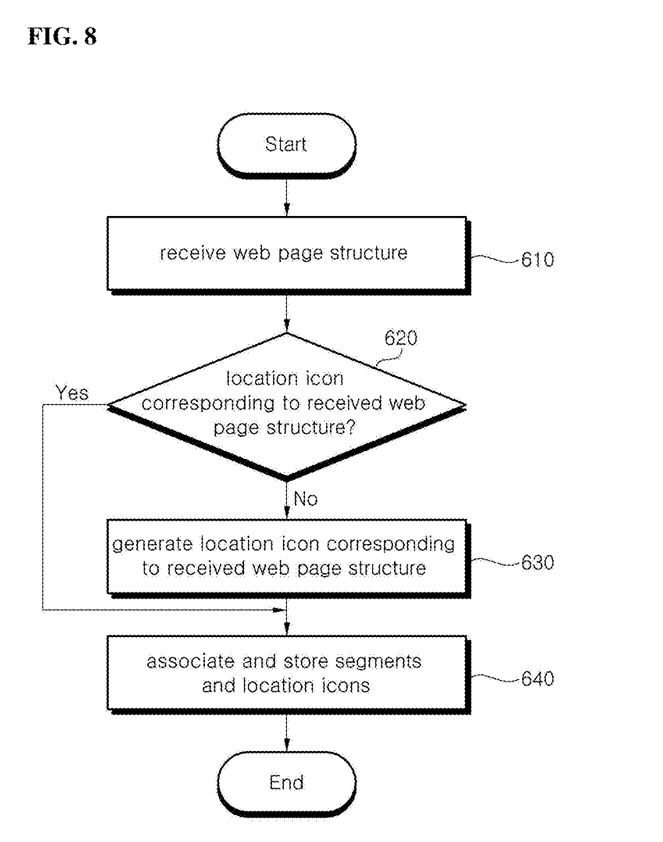
FIG. 8 is a flowchart of an operation of storing a segment in association with a location icon in accordance with an exemplary embodiment of the present invention.

FIG. 8 is a flowchart of an operation of storing a segment in association with a location icon according to an exemplary embodiment.

In operation 610, the transcoder may receive the structure of the web page analyzed in operation 500.

In operation 620, the transcoder may determine whether there is a location icon with a format corresponding to the structure of the web page received in operation 610. That is, the transcoder may search the storage and determine whether there is a location icon with the format corresponding to the structure of the web page.

In operation 630, if it is not determined in operation 620 that the location icon with the format corresponding to the structure of the web page is stored in the storage, the transcoder creates, in real time, the location icon with the format corresponding to the structure of the web page.

In operation 640, the transcoder stores each segment and the location icon with the format corresponding to the structure of the web page in association with each other. For example, each segment and a location icon with a portion marked in gray corresponding to the segment are stored so as to be associated one-to-one with each other. Thus, in response to selection of a location icon on a mobile terminal, a stored segment associated with the location icon may be provided on the mobile terminal.

Referring again to FIG. 4, in operation 700, the transcoder transcodes segments in the web page so that the segments may be displayed on the mobile terminal. For example, where the width of a segment in the web page is too large to be fully displayed on the mobile terminal, the transcoder may reduce the width and increase the height to fit the screen of the mobile terminal. In this case, a user may use a scroll bar to view content in the web page.

Operations 100 to 700 are not necessarily performed in the order shown in FIG. 4 and may be performed in alternate orders.

FIG. 9 is a view of a transcoder for transcoding a web page to be displayed on a mobile terminal with a relatively small screen according to an exemplary embodiment.

Referring to FIG. 9, the transcoder may include a web page element-analyzing module 10, a web page-dividing module 20, a web page structure-analyzing module 30, an icon-associated storage 40, a location icon-generating module 50, a storage 60, a transcoding module 70, and a content-providing module 80.

The web page element-analyzing module 10 may receive HTML source code of a web page that a user wants to view on a mobile terminal, and analyze the source code of the web page. For example, the web page element-analyzing module 10 may analyze the source code of the web page and determine the number of elements of the web page, the proportions of video data, image data, and text data, the size, type and color of font, the left/right/top/bottom margins and scroll bars of the text data.

The web page element-analyzing module 10 may also analyze the source code of the web page and calculate a layout of minimum elements of the web page. For example, the web page element-analyzing module 10 may determine the width and height of each element and calculate the size of each element by multiplying the width by the height.

The web page-dividing module 20 may divide the web page into a plurality of segments based on the layout of the minimum elements calculated by the web page element-analyzing module 10.

For example, the web page-dividing module 20 may set a maximum segment size. The web page-dividing module 20 may compare the set maximum segment size with the sizes of minimum elements calculated by the web page element-analyzing module 10 and combine some minimum elements within the limit of the maximum segment size to create a segment.

The web page structure-analyzing module 30 may determine where the segments divided by the web page-dividing module 20 are located in the web page and analyze the structure of the web page. For example, the web page structure-analyzing module 30 may perform header searching, left sidebar searching, right sidebar searching, footer searching and body searching. Further, the web page structure-analyzing module 30 may determine, based on the search results, where the segments are located in the web page and analyze the structure of the web page.

Header searching, left sidebar searching, right sidebar searching, footer searching and body searching have been described above.

The icon-associated storage 40 may store segments and location icons indicating locations of the segments in the web page in association with each other. The location icons may indicate where the segments are located in the web page and be one-to-one associated with content in the corresponding segments.

The location icons may be created beforehand and stored in the storage 60 of the transcoder. In response to determination of the structure of the web page by the web page structure-analyzing module 30, a corresponding location icon may be read from the storage 60 and associated with a segment. Further, if a location icon corresponding to the structure of the web page is not stored in the storage 60 in the transcoder, the location icon-generating module 50 may create a location icon corresponding to the structure of the web page in real time and associate the location icon with a segment.

The location icon-generating module 50 may generate a location icon having a format of the structure of the web page. For example, the location icon-generating module 50 may generate location icons indicating various formats of web page structures and store them in the storage 60 in the transcoder. Further, if a location icon corresponding to the structure of the web page analyzed by the web page structure-analyzing module 30 is not stored in the storage 60, the location icon-generating module 50 may create a location icon corresponding to the structure of the web page in real time.

The location icons generated by the location icon-generating module 50 may be stored in the storage 60. Further, segments and location icons, which are associated by the icon-associated storage 40, may be stored in the storage 60.

The transcoder 70 may transcode each segment to be displayed on the mobile terminal. For example, where the width of a segment in a web page is too large to be fully displayed on a mobile terminal, the transcoder may reduce the width and increase the height to fit the screen of the mobile terminal. In this case, a user may use a scroll bar to view content in the web page.

The content-providing module 80 may provide content in a segment that is associated with a location icon. For example, in response to selection of a location icon through a mobile terminal, the content-providing module 80 may display, on the mobile terminal, content in a segment that is associated with the location icon.

The exemplary embodiments of the present invention may be realized in the form of a computer-recordable recording medium including program instructions such as program modules that can be implemented by various computer components. The computer-readable recording medium includes all types of recording media in which computer readable data can be stored. The computer readable medium includes all types of recording media in which computer readable data can be stored. Examples of the computer readable media include volatile and non-volatile media and removable and non-removable media. Further, the computer readable medium may include computer storage media and communication media. Examples of the computer storage media include volatile and non-volatile media and removable and non-removable media that are implemented in any method or technique for storage of information such as computer readable commands, data structures, program modules, or other data. Examples of the communication medium typically include computer readable commands, data structures, program modules, other data of modulated data signals such as carrier waves, or other transmission mechanisms, or any data transmission media.

As apparent from the description, since the location icon is provided to correspond to the structure of the web page, a user can grasp the structure of the web page although he or she cannot fully view the web page on the mobile terminal.

Further, a user can easily determine where currently displayed content is located in the web page.

In addition, a user can easily view content associated with a location icon by selecting the location icon.

The various exemplary embodiments described above can be combined to provide further embodiments. All of the patents, patent application publications, patent applications, and non-patent publications referred to in this specification and/or listed in the Application Data Sheet are incorporated herein by reference, in their entirety. Aspects of the exemplary embodiments can be modified, if necessary, to use concepts of the various patents, applications and publications to provide yet further embodiments.

Thus, it should be understood that, while various exemplary embodiments have been described above, they have been presented only by way of example, and are not limiting. For instance, an integrated component may be implemented in the form of discrete components, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of transcoding content to be displayed on mobile terminal, comprising:
   receiving hypertext markup language (HTML) of a web page;
   dividing a web page into a plurality of segments by using tags, each tag specifying a size of each of the plurality of segments of the web page;
   determining a location of each of the plurality of segments of the web page based on a result of at least one of header searching, left sidebar searching, right sidebar searching, footer searching, and body searching;
   determining whether the size of each divided segment is greater than a predetermined segment size;
   combining the each divided segment with a neighboring segment if the size of the combined segment does not exceed the predetermined segment size;
   not combining the each divided segment with the neighboring segment if the size of the combined segment exceeds the predetermined segment size;
   transcoding each of the plurality of segments into a format suitable for display on the mobile terminal;
   storing the transcoded plurality of segments in association with a plurality of location icons each of the plurality of location icons indicating a location of a corresponding segment in the web page; and
   providing a segment associated with a selected location icon to the mobile terminal in response to selection of one of the plurality of location icons on the mobile terminal.

2. The method of claim 1, wherein dividing the web page into a plurality of segments comprises:
   calculating a layout of a plurality of elements of the web page by referring to a source of the web page; and
   determining a structure of the web page based on the calculated layout.

3. The method of claim 1, wherein header searching comprises determining a single segment as a header if the single segment is fully included in a zone at a top of the web page.

4. The method of claim 1, wherein left sidebar searching comprises determining a single segment as a left sidebar if the single segment is fully included in a zone at a left side of the web page.

5. The method of claim 1, wherein right sidebar searching comprises determining a single segment as a right sidebar if the single segment is fully included in a zone at a right side of the web page.

6. The method of claim 1, wherein footer searching comprises determining a single segment as a footer if the single segment is fully included in a zone at a bottom of the web page.

7. The method of claim 1, further comprising:
   generating at least one of the plurality of location icons.

8. The method of claim 1, wherein the predetermined segment size corresponds to a size of a screen of the mobile terminal.

9. A non-transitory computer-readable recording medium comprising an executable program which, when executed, performs the steps of:
   receiving hypertext markup language (HTML) of a web page;
   dividing a web page into a plurality of segments by using tags, each tag specifying a size of each of the plurality of segments of the web page;
   determining a location of each of the plurality of segments of the web page based on a result of at least one of header searching, left sidebar searching, right sidebar searching, footer searching, and body searching;
   determining whether the size of each divided segment is greater than a predetermined segment size;
   combining the each divided segment with a neighboring segment if the size of the combined segment does not exceed the predetermined segment size;
   not combining the each divided segment with the neighboring segment if the size of the combined segment exceeds the predetermined segment size;
   transcoding each of the plurality of segments into a format suitable for display on the mobile terminal;
   storing the transcoded plurality of segments in association with a plurality of location icons each of the plurality of location icons indicating a location of a corresponding segment in the web page; and
   providing a segment associated with a selected location icon to the mobile terminal in response to selection of one of the plurality of location icons on the mobile terminal.

10. A method of displaying content on a mobile terminal, comprising:
    receiving hypertext markup language (HTML) of a web page;
    dividing a web page into segments by using tags, each tag specifying a size of each of the segments of the web page;
    determining whether the size of each divided segment is greater than a predetermined segment size;
    combining the each divided segment with a neighboring segment if the size of the combined segment does not exceed the predetermined segment size;

not combining the each divided segment with the neighboring segment if the size of the combined segment exceeds the predetermined segment size;

displaying N location icons, the N location icons being determined according to the determination, the displayed N location indicating locations of corresponding N segments of a web page divided into the N segments, N being a natural number greater than or equal to two, wherein the N segments are transcoded based on a screen size of the mobile terminal;

receiving a signal indicating selection of one of the N location icons; and displaying a segment associated with the selected location icon on the mobile terminal.

11. The method of claim 10, wherein the displayed segment is one of a header, a left sidebar, a right sidebar, a body, and a footer.

12. The method of claim 10, further comprising:
generating at least one of the N location icons.

13. A non-transitory computer-readable recording medium comprising an executable program which, when executed, performs the steps of:

receiving hypertext markup language (HTML) of a web page;

dividing a web page into segments by using tags, each tag specifying a size of each of the segments of the web page;

determining whether the size of each divided segment is greater than a predetermined segment size;

combining the each divided segment with a neighboring segment if the size of the combined segment does not exceed the predetermined segment size;

not combining the each divided segment with the neighboring segment if the size of the combined segment exceeds the predetermined segment size;

displaying N location icons, the N location icons being determined according to the determination, the displayed N location indicating locations of corresponding N segments of a web page divided into the N segments, N being a natural number greater than or equal to two, wherein the N segments are transcoded based on a screen size of a mobile terminal;

receiving a signal indicating selection of one of the N location icons; and displaying a segment associated with the selected location icon on the mobile terminal.

14. An apparatus for transcoding content into a format suitable for display on a mobile terminal, comprising:

a memory for storing one or more modules configured and executed by a computing device;

a web page-dividing module configured to divide a web page into a plurality of segments by using tags, each tag specifying a size of each of the plurality segments of the web page;

a web page structure-analyzing module configured to determine a location of each of the plurality of segments of the web page based on a result of at least one of header searching, left sidebar searching, right sidebar searching, footer searching, and body searching;

a transcoding module configured to combine the each divided segment with a neighboring segment if the size of the combined segment does not exceed a predetermined segment size and not to combine the each divided segment with the neighboring segment if the size of the combined segment exceeds the predetermined segment size, and to transcode each of the plurality of segments into a format suitable for display on the mobile terminal;

an icon-associated storage device configured to store the transcoded plurality of segments in association with a plurality of location icons, each location icon indicating a location of a corresponding segment in the web page; and a content-providing module configured to provide a stored segment associated with a selected location icon to the mobile terminal in response to selection of one of the plurality of location icons on the mobile terminal.

15. The apparatus of claim 14, further comprising:
a web page element-analyzing module configured to calculate a layout of a plurality of elements of the web page by referring to a source of the web page.

16. The apparatus of claim 15, wherein the web page-dividing module is configured to combine at least two of the plurality of elements based on the calculated layout and a size of the at least two of the plurality of elements.

17. The apparatus of claim 14, further comprising:
a location icon-generating module configured to generate at least one location icon, each of the generated at least one location icons indicating a location of an associated segment of the web page.

* * * * *